United States Patent
Malviya et al.

(10) Patent No.: US 12,474,521 B2
(45) Date of Patent: Nov. 18, 2025

(54) OPTICAL FIBERS WITH IMPROVED BEND PERFORMANCE AND MANUFACTURING METHOD THEREOF

(71) Applicant: Sterlite Technologies Limited, Haryana (IN)

(72) Inventors: Apeksha Malviya, Haryana (IN); Janarthanan Balakrishnan, Haryana (IN); Priya Gupta, Haryana (IN); Shubham Kumar, Haryana (IN); Srinivas Reddy, Haryana (IN); Anand Pandey, Haryana (IN)

(*) Notice: Subject to any disclaimer, the term of this patent is extended or adjusted under 35 U.S.C. 154(b) by 257 days.

(21) Appl. No.: 18/176,565

(22) Filed: Mar. 1, 2023

(65) Prior Publication Data
US 2023/0324602 A1    Oct. 12, 2023

(51) Int. Cl.
*G02B 6/02* (2006.01)
*C03B 37/012* (2006.01)

(52) U.S. Cl.
CPC .... *G02B 6/02042* (2013.01); *C03B 37/01222* (2013.01); *G02B 6/02009* (2013.01)

(58) Field of Classification Search
CPC ............ G02B 6/02042; G02B 6/03638; G02B 6/03616
See application file for complete search history.

(56) References Cited

U.S. PATENT DOCUMENTS

| | | | | |
|---|---|---|---|---|
| 5,712,941 A * | 1/1998 | Imoto | ................ | G02B 6/03627 385/141 |
| 2003/0223717 A1* | 12/2003 | Blaszyk | ............. | G02B 6/03622 385/127 |
| 2019/0025503 A1* | 1/2019 | Maruyama | ......... | G02B 6/02009 |
| 2020/0379168 A1* | 12/2020 | Mukasa | ................ | G02B 6/4246 |
| 2021/0026063 A1* | 1/2021 | Chen | .................... | G02B 6/0365 |
| 2021/0294025 A1* | 9/2021 | Hayashi | .................. | G02B 6/14 |
| 2022/0026629 A1* | 1/2022 | Tandon | ............. | G02B 6/02214 |

FOREIGN PATENT DOCUMENTS

WO    WO-2019032408 A1 *    2/2019    ......... G02B 6/03633

* cited by examiner

*Primary Examiner* — Thomas A Hollweg
*Assistant Examiner* — Marc E Manheim
(74) *Attorney, Agent, or Firm* — Steven R. Fairchild

(57) ABSTRACT

The present invention relates to an optical fiber with improved bend performance and manufacturing method thereof. The optical fiber (100) comprises a core region (108) defined by a core refractive index profile (200) and a cladding region (106) surrounding the core region defined by a cladding refractive index profile (400). Particularly, the core region has a first core (102) defined by a first core refractive index (RI) profile (202) and a first core RI max (Δpeak) and a second core (104) defined by a second core RI profile (204) and a second core RI max (Δcore). Moreover, the cladding region further comprises a first cladding (106) and a third cladding (110) composed of pure silica and a second cladding (108) composed of a down-doped silica, where the down-dopant is fluorine.

8 Claims, 10 Drawing Sheets

OPTICAL FIBERS WITH IMPROVED BEND PERFORMANCE AND MANUFACTURING METHOD THEREOF

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Application No. 202211018078 titled "OPTICAL FIBERS WITH IMPROVED BEND PERFORMANCE AND MANUFACTURING METHOD THEREOF" filed by the applicant on Mar. 28, 2022, which is incorporated herein by reference in its entirety.

FIELD

The present invention relates to the field of optical fibers and more particularly, relates to optical fibers with improved bend performance and manufacturing method thereof.

BACKGROUND OF THE INVENTION

Telecommunications networks include access networks where end-user subscribers connect to service providers. With the advancement of science and technology, various modern technologies are being employed for communication purposes. Over the last few years, there has been a rapid rise in the development and usage of networking technology. This is particularly the case in the field of optical fiber cables and their applications employing a variety of optical fibers as the optical fiber communication technology is one of the most important modern communication technologies.

An optical fiber (i.e., a glass fiber typically surrounded by one or more coating layers) conventionally includes an optical fiber core, which transmits and/or amplifies an optical signal, and an optical cladding, which confines the optical signal within the core. Accordingly, the refractive index of the core nc is typically greater than the refractive index of the optical cladding ng (i.e., nc>ng).

Conventional techniques and manufacturing processes for producing optical fibers generally include drawing an optical fiber downwardly along a linear pathway through the stages of production. Commonly used methods for fabricating optical fiber base materials include Modified Chemical Deposition (MCVD), OVD, Vapor Phase Axis Deposition (VAD), and Plasma Chemical Vapor Deposition (PCVD). Among them, the OVD method is one of the widely used methods because it has a high deposition rate and an advantage of making a fiber base material large.

In the OVD process, a soot preform is deposited on a mandrel, wherein the mandrel revolves at a predetermined speed during deposition. Once the deposition process has been completed, the mandrel is removed and the soot preform is prepared. Currently, there are a few patent applications disclosing optical fibers manufactured using the OVD process.

U.S. Pat. No. 6,771,865B2 titled "Low bend loss optical fiber and components made therefrom" discloses an optical fiber suitable for the manufacture of optical fiber couplers and having low bend loss, low splice loss, and low attenuation.

U.S. Pat. No. 9,086,524B2 titled "Methods for manufacturing optical fiber preform and methods for manufacturing optical fiber" discloses a process for directly depositing the pure SiO2 glass outer cladding layer comprising an OVD (outside vapor deposition) method.

However, there are a number of drawbacks in the current technologies providing optical fibers manufactured using the OVD process. Due to the removal of the mandrel, the optical fiber drawn from a glass preform prepared from the soot preform, has a refractive index profile with a center line dip. Because of the dip near a core region of the optical fiber, the bend performance of the optical fiber degrades, which further results in bend induced attenuation. Moreover, the optical fiber of G657 category encounters bend performance failures and bend induced attenuation due to the center line dip. Furthermore, none of the priorts control/reduce such bend induced attenuation for improving bend performance. Further, the central line dip of the optical fiber is not controlled in the OVD process in the prior arts.

Accordingly, to overcome the disadvantages of the prior arts, there is a need for a technical solution that overcomes the above-stated limitations in the prior arts. The present invention provides an optical fiber with improved bend performance and manufacturing method thereof.

SUMMARY OF THE INVENTION

Embodiments of the present invention provide an optical fiber comprising a core region defined by a core refractive index profile and having a first core defined by a first core refractive index (RI) profile and a first core RI max ($\Delta peak$) and a second core defined by a second core RI profile and a second core RI max ($\Delta core$) a cladding region surrounding the core region defined by a cladding refractive index profile and a cladding RI max ($\Delta clad$). In particular, the first core RI max ($\Delta peak$) is greater than the second core RI max ($\Delta core$). And, the first core RI max ($\Delta peak$) is greater than the second core RI max ($\Delta core$) and the second core RI max ($\Delta core$) is greater than the cladding RI max ($\Delta clad$).

In accordance with an embodiment of the present invention, the absolute difference between the first core RI max ($\Delta peak$) and the second core RI max ($\Delta core$) is between 0.02 to 0.14.

In accordance with an embodiment of the present invention, the cladding region further comprises a first cladding, a second cladding and a third cladding. In particular, the first cladding and the third cladding have pure silica and the second cladding has down-doped silica.

In accordance with an embodiment of the present invention, a ratio of the second core RI max ($\Delta core$) to the first core RI max ($\Delta peak$) is in a range between 0.8 and 0.9.

In accordance with an embodiment of the present invention, the first core and the second core are up-doped. Each of the first core and the second core is defined by a radial dimension, wherein the radial dimension (R1) of the first core is in a range between 0.5 μm and 1.5 μm and the radial dimension (R2) of the second core is in a range between 4.4 μm and 4.8 μm.

In accordance with an embodiment of the present invention, each of a first cladding, a second cladding and a third cladding is defined by a radial dimension. In particular, the radial dimension (R3) of the first cladding is in a range of 7.5

μm and 8.5 μm, the radial dimension (R4) of the second cladding is in a range of 12 μm and 16 μm and the radial dimension (R5) of the third cladding is in a range of 45 μm and 50.5 μm.

In accordance with an embodiment of the present invention, the optical fiber has a dispersion less than or equal to 18 ps/nm-km at 1550 nm wavelength, an MFD (mode field diameter) of 8.6±0.4 μm at 1310 nm wavelength and a cable cut-off wavelength of less than or equal to 1260 nm.

In accordance with an embodiment of the present invention, the optical fiber has a macro-bend loss of less than or equal to 0.03 dB per 10 turns at 15 mm radius and at 1550 nm wavelength and a macro-bend loss of less than or equal to 0.1 dB per 10 turns at 15 mm radius and at 1625 nm wavelength.

Alternatively, macro-bend loss of less than or equal to 0.1 dB/turn at 10 mm radius and at 1550 nm wavelength and a macro-bend loss of less than or equal to 0.2 dB/turn at 10 mm radius and at 1625 nm wavelength. Alternatively, a macro-bend loss of less than or equal to 0.2 dB/turn at 7.5 mm radius and at 1550 nm wavelength and a macro-bend loss of less than or equal to 0.5 dB/turn at 7.5 mm radius and at 1625 nm wavelength.

In accordance with an embodiment of the present invention, the optical fiber has a Young's modulus for a primary coating layer between 0.0002 GPa and 0.0004 GPa and a Young's modulus for a secondary coating layer between 1.1 Gpa and 1.7 Gpa.

Another embodiment of the present invention relates to a method of manufacturing the optical fiber comprising steps of inserting a GeO2 doped glass rod in a central hole of a soot preform, drying the soot preform and doping the soot preform with fluorine, sintering the soot preform to convert the soot preform into a silica preform, drawing a core rod from the sintered silica preform, over-cladding the core rod with soot particles to form an optical fiber preform, sintering the optical fiber preform and drawing the optical fiber from the optical fiber preform. The GeO2 doped glass rod is a central rod having a diameter in a range of 5 mm-10 mm.

The foregoing objectives of the present invention are attained by employing optical fibers with improved bend performance and manufacturing method thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Figure 1:
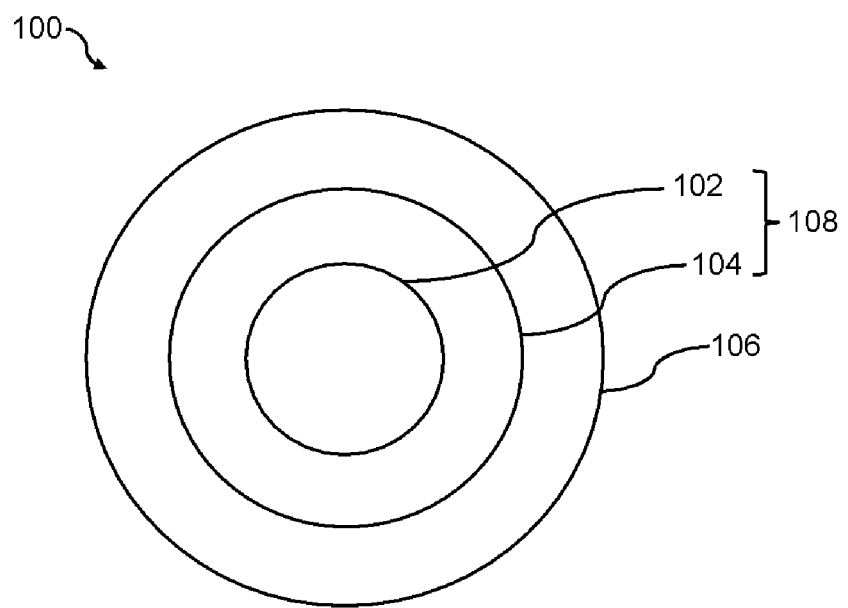
FIG. 1 is a snapshot illustrating a cross-sectional view of an optical fiber depicting a core region having a first core and a second core; and a cladding region in accordance with an embodiment of the present invention.

Optical fiber—100
First core—102
Second core—104
Cladding region—106
Core region—108
First cladding—110
Second cladding—112
Third cladding—114
Primary coating layer—116
Secondary coating layer—118
Refractive index profile—200, 400, 700
First core refractive index (RI) profile—202
Second core RI profile—204
GeO2 doped glass rod—902
Soot preform—904
Draw furnace—906
Silica preform—908
Core rod—910
Optical fiber preform—912

It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

The principles of the present invention and their advantages are best understood by referring to FIG. 1 to FIG. 10. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention.

Optical fiber is a thin strand of glass or plastic or combination thereof capable of transmitting/propagating optical signals.

Mode field diameter defines a section or area of optical fiber in which the optical signals travel and dispersion defines spreading of light pulse as it travels down the length of the optical fiber.

Macro bend loss is defined by a loss occurred when an optical fiber cable is subjected to a significant amount of bending above a critical value of curvature.

Cable cut-off wavelength is a minimum wavelength in which the optical fiber acts as a single mode fiber.

Figure 2:
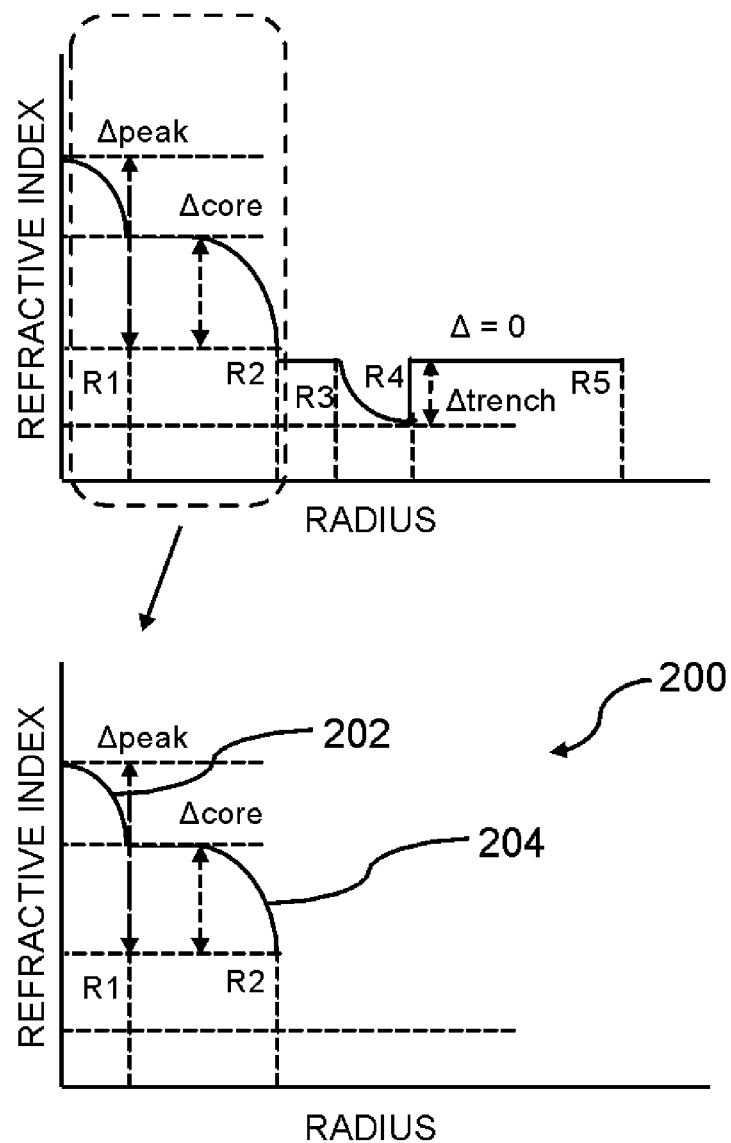
FIG. 2 illustrates a refractive index profile of the core region of the optical fiber in accordance with an embodiment of the present invention.
Figure 3:
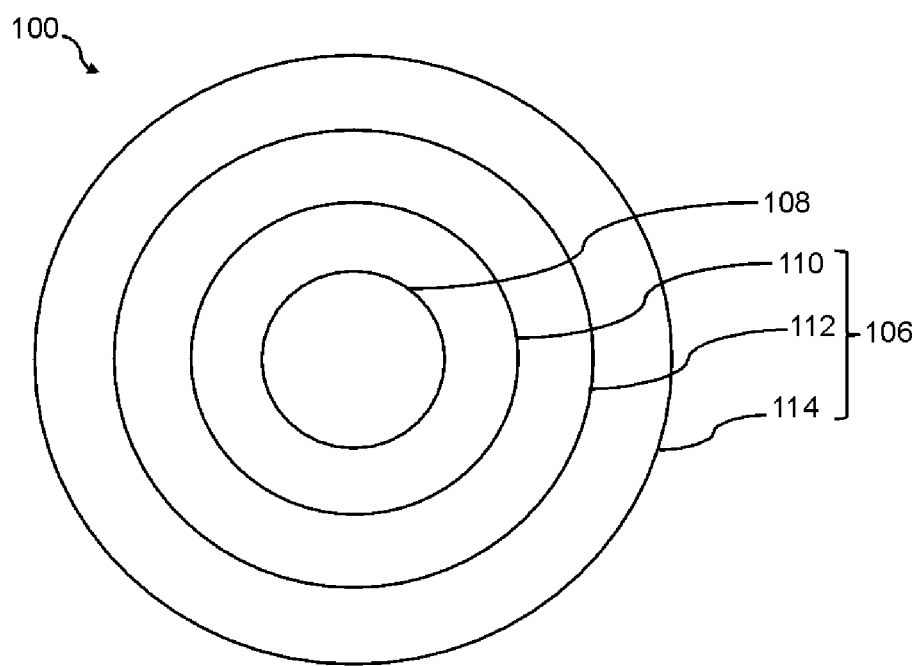
FIG. 3 is a snapshot illustrating a cross-sectional view of the optical fiber depicting the core region and the cladding region having a first cladding, a second cladding and a third cladding in accordance with an embodiment of the present invention.
Figure 4:
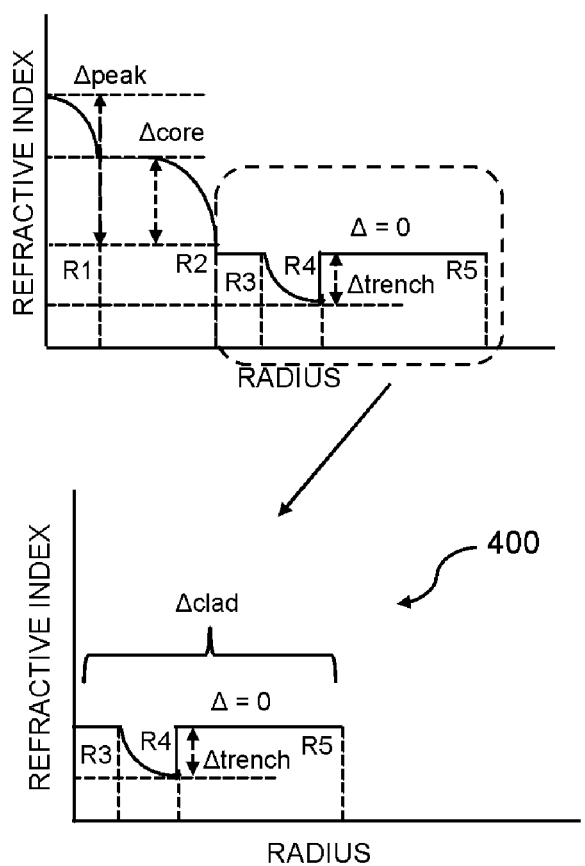
FIG. 4 illustrates a refractive index profile of the cladding region of the optical fiber in accordance with an embodiment of the present invention.
Figure 5:
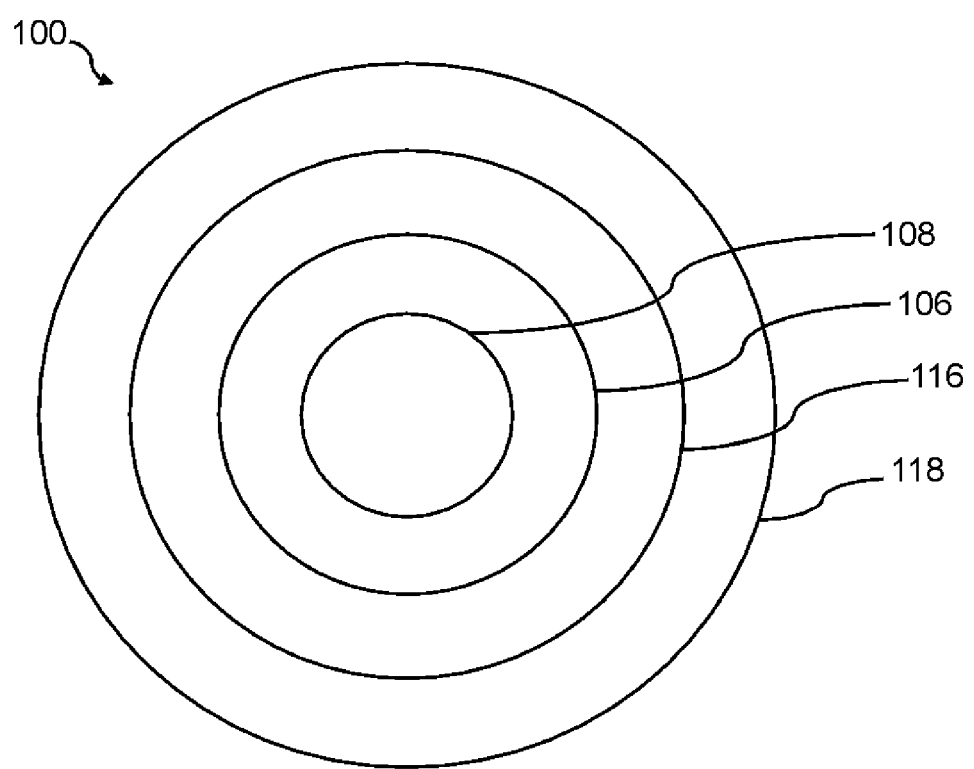
FIG. 5 is a snapshot illustrating a cross-sectional view of the optical fiber having the core region, the cladding region, a primary coating layer and a secondary coating layer in accordance with an embodiment of the present invention.
Figure 6:
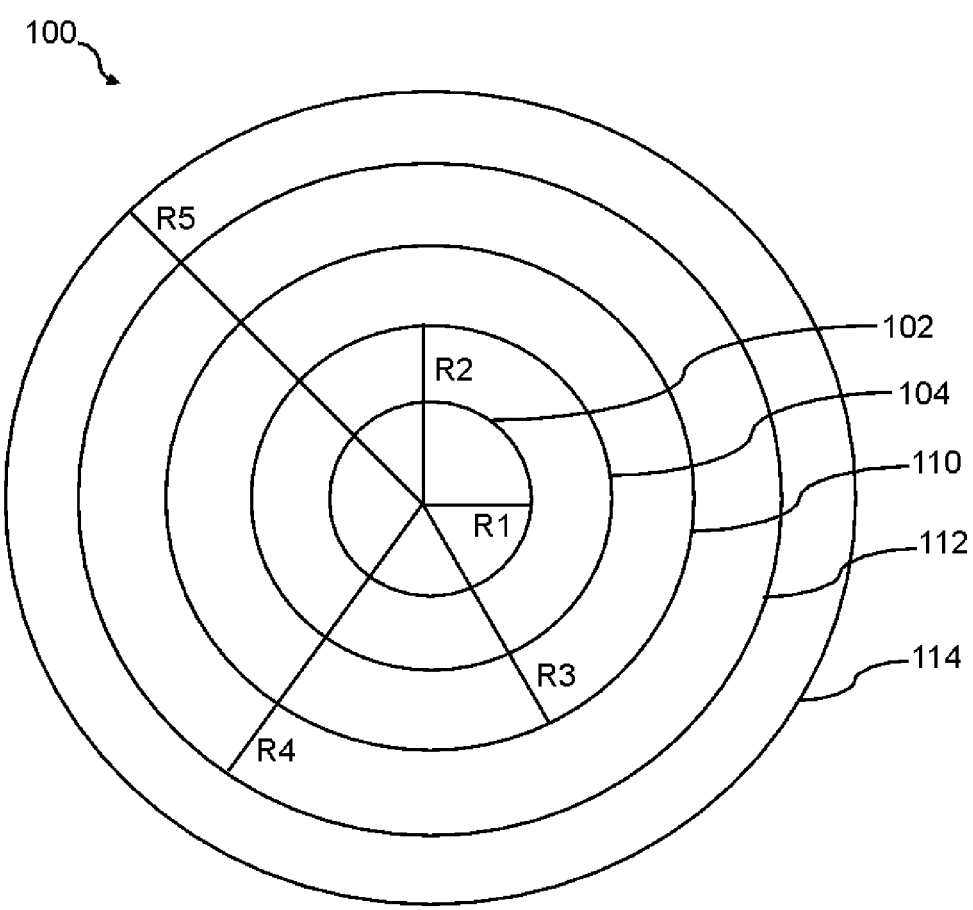
FIG. 6 is a snapshot illustrating a cross-sectional view of the optical fiber having the first core, the second core, the first cladding, the second cladding and the third cladding in accordance with an embodiment of the present invention.
Figure 7:
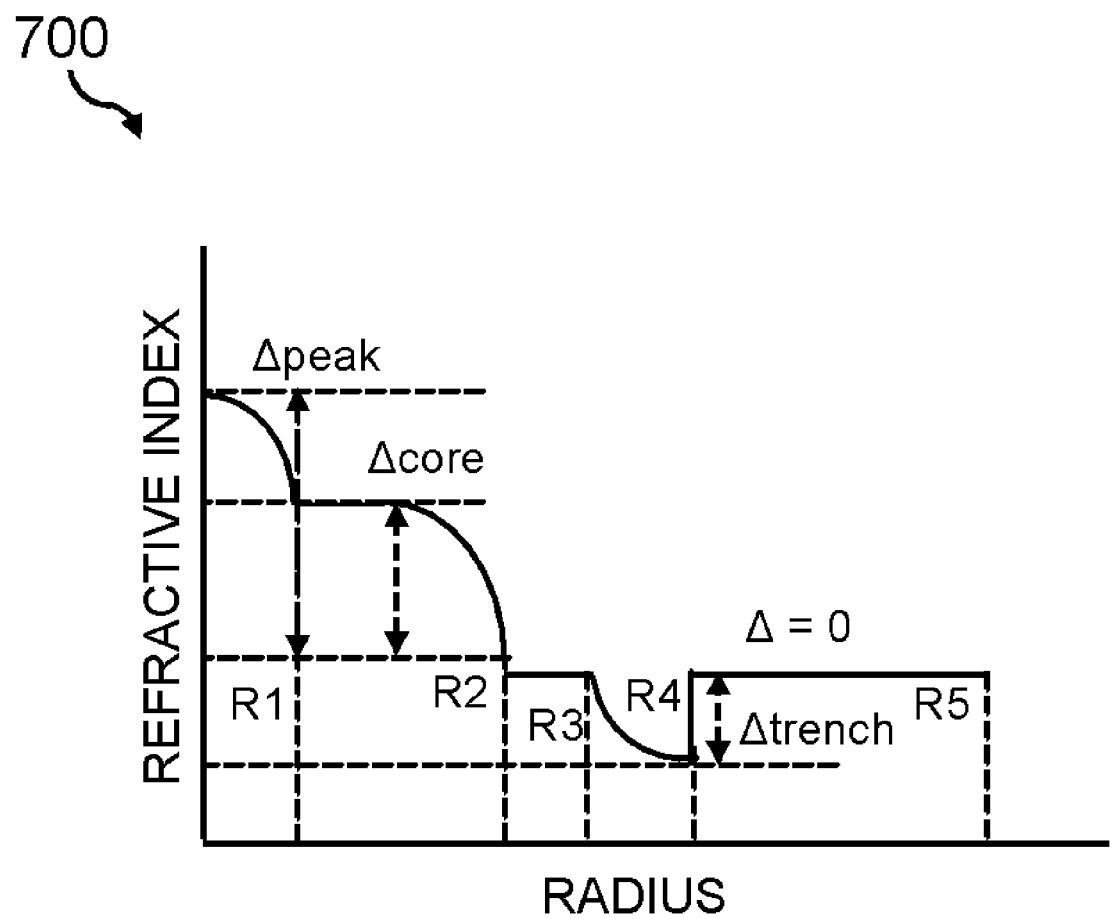
FIG. 7 illustrates a refractive index profile of the optical fiber having the first core, the second core, the first cladding, the second cladding and the third cladding in accordance with an embodiment of the present invention.
Figure 8:
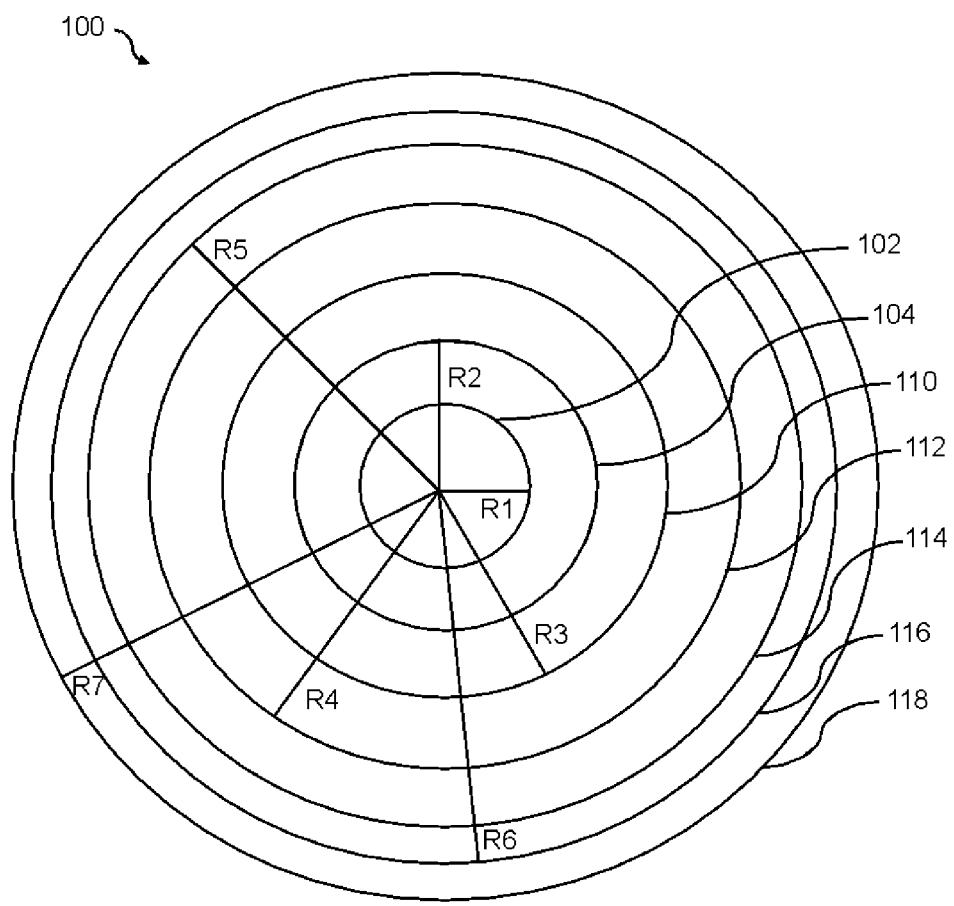
FIG. 8 is a snapshot illustrating a cross-sectional view of the optical fiber having the first core, the second core, the first cladding, the second cladding, the third cladding, the primary coating layer and the secondary coating layer in accordance with an embodiment of the present invention.

Referring to FIG. 1 and FIG. 8 simultaneously, in which FIG. 1 illustrates a cross-sectional view of an optical fiber 100 depicting a core region 108 having a first core 102 and a second core 104; and a cladding region 106, FIG. 2 illustrates a refractive index profile 200 of the core region 108 of the optical fiber 100, FIG. 3 illustrates a cross-sectional view of the optical fiber 100 depicting the core region 108 and the cladding region 106 having a first cladding 110, a second cladding 112 and a third cladding 114, FIG. 4 illustrates a refractive index profile 400 of the cladding region 106 of the optical fiber 100, FIG. 5 illustrates a cross-sectional view of the optical fiber 100 having the core region 108, the cladding region 106, a primary coating layer 116 and a secondary coating layer 118, FIG. 6 illustrates a cross-sectional view of the optical fiber 100 having the first core 102, the second core 104, the first cladding 110, the second cladding 112 and the third cladding 114, FIG. 7 illustrates a refractive index profile 700 of the optical fiber 100 having the first core 102, the second core 104, the first cladding 110, the second cladding 112 and the third cladding 114 and FIG. 8 illustrates a cross-sectional view of the optical fiber 100 having the first core 102, the second core 104, the first cladding 110, the second cladding 112, the third cladding 114, the primary coating layer 116 and the secondary coating layer 118.

The optical fiber 100 is configured to transmit information over long distances. The optical fiber 100 uses light to transmit voice and data communications over long distances when encapsulated in a jacket/sheath. The optical fiber 100 may be a bend insensitive fiber that has less degradation in optical properties or increment in optical attenuation during multiple winding/unwinding operations of an optical fiber cable. The optical fiber 100 may be defined by one or more cores and one or more claddings. Further, an up-dopant for e.g. Germanium may be added in the one or more cores, which helps in confinement of light within the one or more cores and the one or more claddings may either be kept un-doped or down-doped so as to avoid signal loss. Technically, this can be termed as difference in refractive index profiles of the one or more cores compared to the one or more claddings which helps in confinement of light within a stipulated core region.

The optical fiber 100 comprises the core region 108 and the cladding region 106 surrounding the core region 108. In particular, the core region 108 is the region in which the optical signal is confined and the cladding region 106 is the region which prevents loss of signal by preventing any signal leakage from the core region 108. Such a structure of the core region 108 and the cladding region 106 is also termed as an optical waveguide. The core region 108 may be defined by a core refractive index profile 200 as depicted in FIG. 2. Moreover, the core region 108 may have the first core 102 and the second core 104. Further, the first core 102 is a central core defined by a first core refractive index (RI) profile 202 and a first core refractive index max $\Delta$peak.

Similarly, the second core 104 is a peripheral or annular core region defined by a second core RI profile 204 and a second core RI max $\Delta$core, where the second core 104 surrounds the first core 102. The first core RI max $\Delta$peak may be greater than the second core RI max $\Delta$core and the first core RI max $\Delta$peak may be greater than the rest of refractive indices. A ratio of the second core RI max $\Delta$core to the first core RI max $\Delta$peak is in a range between 0.8 and 0.9 and an absolute difference between the first core RI max $\Delta$peak and the second core RI max $\Delta$core is in a range between 0.02 to 0.14. Alternatively, the ratio of the second core RI max $\Delta$core to the first core RI max $\Delta$peak and the absolute difference between the first core RI max $\Delta$peak and the second core RI max $\Delta$core may vary.

In accordance with an embodiment of the present invention, the core region 108 may be composed of silica having up-dopant. The up-dopant is an additive for increasing a refractive index of silica. In particular, the up-dopant may be, but not limited to, germanium oxide (GeO2) and chlorine. Preferably, the up-dopant is germanium oxide (GeO2). Moreover, the up-dopant concentration in the first core 102 and in the second core 104 may vary. Further, the GeO2 doping results in centreline peak, i.e., the first core RI max Δpeak that helps in improving bend performance as compared to existing centreline dip OVD fiber profile, results in better confinement of light at the center of the core region and reduces an M-bend failure percentage.

In accordance with an embodiment of the present invention, each of the first core 102 and the second core 104 may be defined by a radial dimension. In particular, the radial dimension (R1) of the first core 102 may be in a range between 0.5 μm and 1.5 μm and the radial dimension (R2) of the second core 104 may be in a range between 4.4 μm and 4.8 μm. Alternatively, the radial dimension of the first core 102 and the second core 104 may vary.

In accordance with an embodiment of the present invention, the cladding region 106 may be defined by a cladding refractive index profile 400 as depicted in FIG. 4. The cladding RI max Δclad, wherein the first core RI max Δpeak is greater than the second core RI max Δcore and the second core RI max Δcore is greater than the cladding RI max Δclad. Further, the cladding region 106 may comprise the first cladding 110 surrounding the core region 108, the second cladding 112 surrounding the first cladding 110 and the third cladding 114 surrounding the second cladding 112 as depicted in FIG. 3, FIG. 6 and FIG. 8. In particular, the first cladding 110 may be a buffer cladding layer.

Each of the first cladding 110, the second cladding 112 and the third cladding 114 may be defined by a radial dimension. In particular, the radial dimension (R3) of the first cladding 110 may be in a range of 7.5 μm and 8.5 μm, the radial dimension (R4) of the second cladding 112 may be in a range of 12 μm and 16 μm and the radial dimension (R5) of the third cladding 114 may be in a range of 45 μm and 50.5 μm. Alternatively, the radial dimension of the first cladding 110, the second cladding 112 and the third cladding 114 may vary.

In accordance with an embodiment of the present invention, the first cladding 110 and the third cladding 114 may be composed of pure silica, therefore may be called as pure silica annular claddings, and the second cladding 112 may be composed of a down-doped silica, hence called as down-doped cladding trench. In particular, the down-dopant may be, but not limited to, fluorine and boron. Preferably, the down-dopant is fluorine. The down-dopant has a propensity to lower the refractive index of the silica. Accordingly, the cladding region 106 may have a fluorinated trench/depression. The second cladding 112 may have a fluorinated trench/depression defined by a thickness R4-R3 (i.e., difference between the radial dimension (R4) of the second cladding 112 and the radial dimension (R3) of the first cladding 110.

Table 1 and Table 2 are tabular representation summarizing the refractive index profile (centreline peak profile) 700 of the optical fiber 100 as shown in FIG. 7:

TABLE 1

| | Refractive Index Profile | | | | | |
|---|---|---|---|---|---|---|
| | First Core | | | Second Core | | |
| SN | R1 | Δpeak | Alpha | R2 | Δcore | Alpha |
| 1 | 0.5 | 0.52 | 2 | 4.4 | 0.43 | 5 |
| 2 | 0.91 | 0.50 | 1 | 4.7 | 0.45 | 6 |

TABLE 1-continued

| | Refractive Index Profile | | | | | |
|---|---|---|---|---|---|---|
| | First Core | | | Second Core | | |
| SN | R1 | Δpeak | Alpha | R2 | Δcore | Alpha |
| 3 | 1.5 | 0.53 | 3 | 4.5 | 0.42 | 8 |
| 4 | 1.07 | 0.48 | 1 | 4.8 | 0.4 | 4 |
| MIN | 0.5 | 0.48 | 1 | 4.4 | 0.4 | 4 |
| MAX | 1.5 | 0.52 | 3 | 4.8 | 0.45 | 8 |

TABLE 2

| | Refractive Index Profile | | | | |
|---|---|---|---|---|---|
| | | Trench | | | |
| SN | R3 | R4 | Δtrench | Alpha | R5 |
| 1 | 7.95 | 16 | −0.23 | 3 | 46.5 |
| 2 | 7.6 | 12 | −0.25 | 4 | 50.5 |
| 3 | 7.7 | 13.5 | −0.21 | 2 | 49 |
| 4 | 8.5 | 15 | −0.22 | 3 | 47.5 |
| MIN | 7.5 | 12 | −0.2 | 2 | 45 |
| MAX | 8.5 | 16 | −0.25 | 4 | 50.5 |

In accordance with an embodiment of the present invention, the optical fiber 100 may be characterized by a dispersion less than or equal to 18 ps/nm-km at 1550 nm wavelength and an MFD (mode field diameter) of 8.6±0.4 μm at 1310 nm wavelength. In particular, the optical fiber 100 may have a zero dispersion wavelength in a range of 1300 nm and 1324 nm. Moreover, the optical fiber 100 may have a macro-bend loss of less than or equal to 0.03 dB per 10 turns at 15 mm radius and at 1550 nm wavelength and a macrobend loss of less than or equal to 0.1 dB per 10 turns at 15 mm radius and at 1625 nm wavelength. Further, the optical fiber 100 may have a macro-bend loss of less than or equal to 0.1 dB/turn at 10 mm radius and at 1550 nm wavelength and a macro-bend loss of less than or equal to 0.2 dB/turn at 10 mm radius and at 1625 nm wavelength. Furthermore, the optical fiber 100 may have a macro-bend loss of less than or equal to 0.2 dB/turn at 7.5 mm radius and at 1550 nm wavelength and a macro-bend loss of less than or equal to 0.5 dB/turn at 7.5 mm radius and at 1625 nm wavelength.

In accordance with an embodiment of the present invention, the optical fiber 100 may be characterized by a cable cut-off wavelength of less than or equal to 1260 nm. Alternatively, the cable cut-off, dispersion, zero dispersion wavelength, MFD and macro-bend loss may vary.

In accordance with an embodiment of the present invention, the optical fiber 100 may be coated with primary and secondary coatings as depicted in FIG. 5 and FIG. 8, where Young's modulus for the primary coating layer 116 is between 0.0002 GPa and 0.0004 GPa and Young's modulus for the secondary coating layer 118 is between 1.1 Gpa and 1.7 Gpa. Alternatively, Young's modulus may vary. The optical fiber 100 may have a diameter less than or equal to 250 μm.

In accordance with an embodiment of the present invention, for the optical fiber having a diameter of 250 μm, a diameter (2*R6) of the primary coating layer 116 (i.e., a primary diameter) may be between 180-200 μm and a diameter (2*R7) of the secondary coating layer 118 (i.e., secondary diameter) may be between 240-247 μm. Alternatively, for the optical fiber having a diameter of 200 μm, a diameter of the primary coating layer (i.e., a primary diameter) may be between 150-170 μm and a diameter of the secondary coating layer (i.e., secondary diameter) may be between 195-205 μm with tolerance value.

Figure 9:
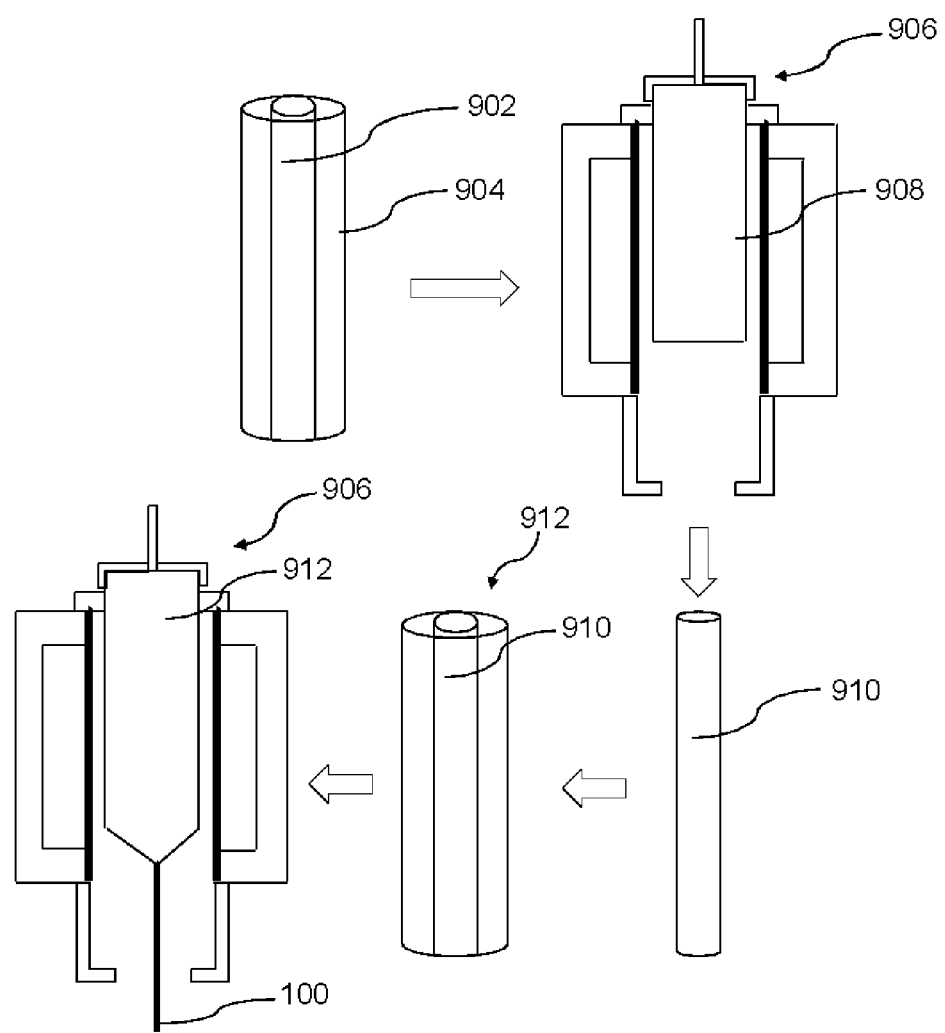
FIG. 9 is a snapshot illustrating a process of manufacturing the optical fiber in accordance with an embodiment of the present invention.

FIG. 9 is a snapshot illustrating a process of manufacturing the optical fiber in accordance with an embodiment of the present invention. The process includes inserting a GeO2 doped glass rod 902 in a central hole of a soot preform 904 and drying the soot preform 904 and doping the soot preform 904 with fluorine, sintering the soot preform 904 in a draw furnace 906 to convert the soot preform into a silica preform 908 and drawing a core rod 910 from the sintered silica preform 908, over-cladding the core rod 910 with soot particles to form an optical fiber preform 912 and sintering the optical fiber preform 912 in the draw furnace 906 from which the optical fiber 100 is drawn. In particular, the GeO2 doped glass rod 902 is a central rod having a diameter in a range of 5 mm-10 mm.

Figure 10:
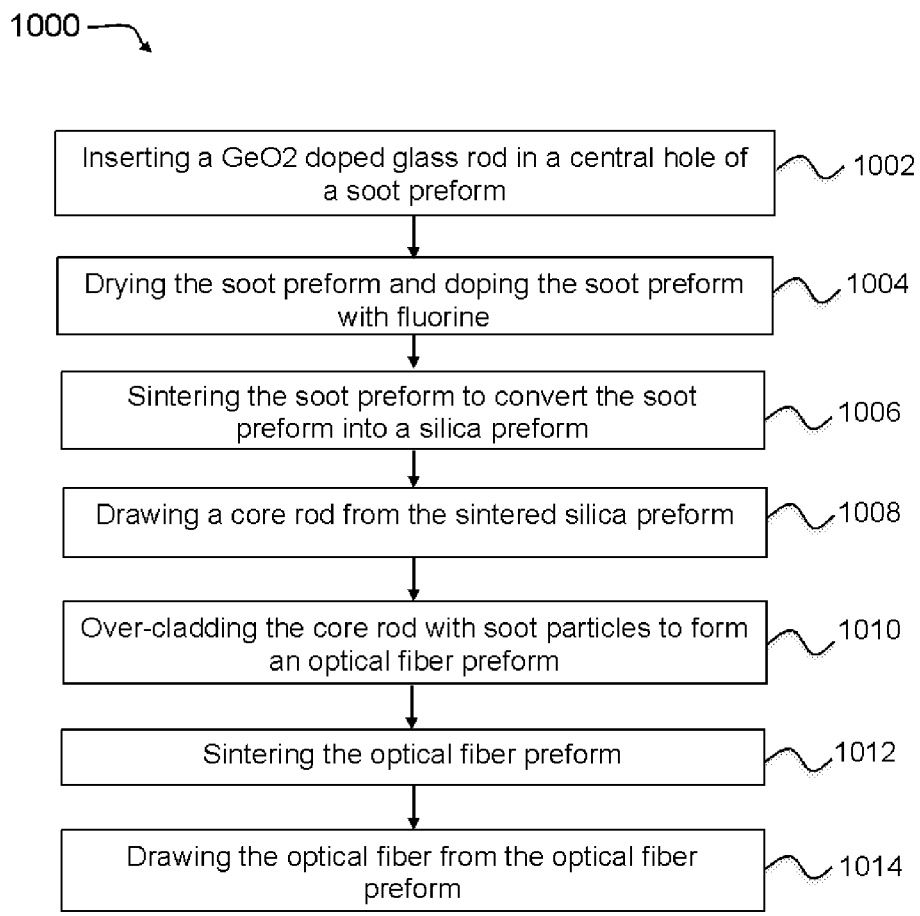
FIG. 10 is a flowchart illustrating a method of manufacturing the optical fiber in accordance with an embodiment of the present invention.

FIG. 10 is a flowchart illustrating a method 1000 of manufacturing the optical fiber 100 in accordance with an embodiment of the present invention. Method 1000 starts at step 1002 and proceeds to steps 1004, 1006, 1008, 1010, 1012, 1014.

At step 1002, the GeO2 doped glass rod 902 is inserted in the central hole of the soot preform 904. In particular, the GeO2 doped glass rod 902 is a central rod having a diameter in a range of 5 mm-10 mm.

At step 1004, the soot preform 904 is dried and doped with fluorine.

At step 1006, the soot preform 904 is sintered to convert the soot preform into a silica preform 908.

At step 1008, the core rod 910 is drawn from the sintered silica preform 908.

At step 1010, the core rod 910 is over-cladded with soot particles to form the optical fiber preform 912.

At step 1012, the optical fiber preform 912 is sintered.

At step 1014, the optical fiber 100 is drawn from the optical fiber preform 912.

Preferably, the optical fiber 100 disclosed herein is made by an outside vapor deposition (OVD) process familiar to the skilled artisan. Alternatively, other processes, which are known in the art, may be used to manufacture the optical fiber 100 disclosed herein.

Advantageously, the first core 102 has improved bend performance due to the first core RI max Δpeak, which is also called as centreline peak, which gives better confinement of light in the first core 102 as effective refractive index will be greater than the effective refractive index of the centreline dip profile. Similarly, the second core 104 helps in achieving mode field diameter, zero dispersion, cable cut-off wavelength and macro-bend losses in a range explained below and the second cladding 112 improves bend insensitivity of the optical fiber 100.

The optical fiber with improved bend performance and manufacturing method therefore solves the problem of bend performance failure which is achieved by developing an optical fiber having a refractive index profile with a central (or centreline) peak. Moreover, the fluorinated refractive index profile with central peak for better bend performance, thereby reducing bend induced attenuation.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

The invention claimed is:

1. An optical fiber (100) comprising:
a core region (108) defined by a core refractive index profile (200), wherein the core region (108) has a first core (102) defined by a first core refractive index (RI) profile (202) and a first core RI max (Δpeak) and a second core (104) defined by a second core RI profile (204) and a second core RI max (Δcore), wherein an absolute difference between the first core RI max (Δpeak) and the second core RI max (Δcore) is between 0.02 to 0.14, wherein the first core (102) has a first core alpha between 1 to 3 and the second core (108) has a second core alpha between 4 to 8; and
a cladding region (106) surrounding the core region (108), wherein the cladding region (106) is defined by a cladding refractive index profile (400) and a cladding RI max (Δclad), wherein the cladding region (106) further comprising a first cladding (110), a second cladding (112) and a third cladding (114) such that the first cladding (110) and the third cladding (114) have pure silica and the second cladding (112) has down-doped silica, wherein the first core RI max (Δpeak) is greater than the second core RI max (Δcore) and the second core RI max (Δcore) is greater than the cladding RI max (Δclad),
wherein the optical fiber (100) has a macro-bend loss of less than or equal to 0.03 dB per 10 turns at 15 mm radius and at 1550 nm wavelength and a macro-bend loss of less than or equal to 0.1 dB per 10 turns at 15 mm radius and at 1625 nm wavelength.

2. The optical fiber (100) as claimed in claim 1, wherein a ratio of the second core RI max (Δcore) to the first core RI max (Δpeak) is in a range between 0.8 and 0.9.

3. The optical fiber (100) as claimed in claim 1, wherein the first core (102) and the second core (104) are up-doped.

4. The optical fiber (100) as claimed in claim 1, wherein each of the first core (102) and the second core (104) is defined by a radial dimension, wherein the radial dimension (R1) of the first core (102) is in a range between 0.5 μm and 1.5 μm and the radial dimension (R2) of the second core (104) is in a range between 4.4 μm and 4.8 μm.

5. The optical fiber (100) as claimed in claim 1, wherein each of a first cladding (110), a second cladding (112) and a third cladding (114) is defined by a radial dimension, wherein the radial dimension (R3) of the first cladding (110) is in a range of 7.5 μm and 8.5 μm, the radial dimension (R4) of the second cladding (112) is in a range of 12 μm and 16 μm and the radial dimension (R5) of the third cladding (114) is in a range of 45 μm and 50.5 μm.

6. The optical fiber (100) as claimed in claim 1, wherein the optical fiber (100) has a dispersion less than or equal to 18 ps/nm-km at 1550 nm wavelength, an MFD (mode field diameter) of 8.6±0.4 μm at 1310 nm wavelength and a cable cut-off wavelength of less than or equal to 1260 nm.

7. The optical fiber (100) as claimed in claim 1, wherein the optical fiber (100) has:
   a macro-bend loss of less than or equal to 0.1 dB/turn at 10 mm radius and at 1550 nm wavelength and a macro-bend loss of less than or equal to 0.2 dB/turn at 10 mm radius and at 1625 nm wavelength; and
   a macro-bend loss of less than or equal to 0.2 dB/turn at 7.5 mm radius and at 1550 nm wavelength and a macro-bend loss of less than or equal to 0.5 dB/turn at 7.5 mm radius and at 1625 nm wavelength.

8. The optical fiber (100) as claimed in claim 1, wherein the optical fiber (100) has a Young's modulus for a primary coating layer (116) between 0.0002 GPa and 0.0004 GPa and a Young's modulus for a secondary coating layer (118) between 1.1 Gpa and 1.7 Gpa.

\* \* \* \* \*